US012566858B2

(12) United States Patent
Tan et al.

(10) Patent No.: US 12,566,858 B2
(45) **Date of Patent: \*Mar. 3, 2026**

(54) COMPUTER SYSTEM FOR FAILING A SECURE BOOT IN A CASE TAMPERING EVENT

(71) Applicant: Moxa Inc., New Taipei City (TW)

(72) Inventors: Yoong Tak Tan, New Taipei City (TW); Chih-Yu Chen, New Taipei City (TW); Che-Yu Huang, New Taipei City (TW); Hsin-Ju Wu, New Taipei City (TW); Tsung-Yuan Wu, New Taipei City (TW); Tzung-Fu Tsai, New Taipei City (TW); Kuo-Chen Wu, New Taipei City (TW); Jian-Yu Liao, New Taipei City (TW); Tsung-Li Fang, New Taipei City (TW)

(73) Assignee: Moxa Inc., New Taipei City (TW)

( \* ) Notice: Subject to any disclaimer, the term of this patent is extended or adjusted under 35 U.S.C. 154(b) by 0 days.

This patent is subject to a terminal disclaimer.

(21) Appl. No.: 17/565,463

(22) Filed: Dec. 30, 2021

(65) Prior Publication Data

US 2023/0214493 A1 Jul. 6, 2023

(51) Int. Cl.
*G06F 21/57* (2013.01)
*G06F 21/86* (2013.01)

(52) U.S. Cl.
CPC ............ *G06F 21/575* (2013.01); *G06F 21/86* (2013.01)

(58) Field of Classification Search
CPC .............................. G06F 21/575; G06F 21/86
See application file for complete search history.

(56) References Cited

U.S. PATENT DOCUMENTS

| | | | | |
|---|---|---|---|---|
| 10,064,240 | B2 | 8/2018 | Stern | |
| 11,088,840 | B2 | 8/2021 | Nolte | |
| 2003/0084285 | A1* | 5/2003 | Cromer | G06F 21/554 |
| | | | | 713/164 |
| 2007/0204166 | A1 | 8/2007 | Tome | |

(Continued)

FOREIGN PATENT DOCUMENTS

| | | |
|---|---|---|
| CN | 105164694 A | 12/2015 |
| CN | 107241452 A | 10/2017 |

(Continued)

OTHER PUBLICATIONS

Jacob, N., Heyszl, J., Zankl, A., Rolfes, C., & Sigl, G., How to break secure boot on FPGA SoCs through malicious hardware, International Association for Cryptologic Research 2017, In International Conference on Cryptographic Hardware and Embedded Systems pp. 425-442 https://link.springer.com/ Sep. 2017 https://link.springer.com/content/pdf/10.1007/978-3-319-66787-4_21.pdf, 2017.

(Continued)

*Primary Examiner* — Shewaye Gelagay
(74) *Attorney, Agent, or Firm* — Winston Hsu

(57) ABSTRACT

A computer system for failing a secure boot in a case tampering event comprises a trusted platform module (TPM), for generating a plurality of random bytes for a secure boot of the computer system; a bootloader, for storing information in at least one hardware of the computer system and performing the secure boot, wherein the information comprises the plurality of random bytes, and the TPM is comprised in the bootloader; an operating system (OS), for performing the secure boot; and at least one sensor, for detecting a case tampering event in the computer system, and transmitting a signal for triggering a deletion of the plurality of random bytes, if the case tampering event happens in the computer system. The bootloader or the OS performs the operation of deleting the plurality of random bytes stored in the at least one hardware to fail the secure boot, in response to the signal.

6 Claims, 3 Drawing Sheets

(56) References Cited

U.S. PATENT DOCUMENTS

| | | | | |
|---|---|---|---|---|
| 2011/0213953 | A1* | 9/2011 | Challener | ............... G06F 21/57 |
| | | | | 713/2 |
| 2015/0365227 | A1 | 12/2015 | Billau | |
| 2016/0026810 | A1 | 1/2016 | Hagiwara | |
| 2016/0292422 | A1* | 10/2016 | Hayashi | .................. G06F 21/57 |
| 2018/0007040 | A1* | 1/2018 | Thom | .................. G06F 21/575 |
| 2018/0293390 | A1* | 10/2018 | Baker | ................. G06F 21/6218 |
| 2021/0049310 | A1* | 2/2021 | Grobelny | ............. H04L 9/0825 |
| 2022/0391545 | A1* | 12/2022 | Stewart | ................. G06F 3/0683 |
| 2023/0134324 | A1* | 5/2023 | Emerson | ................. G06F 21/53 |
| | | | | 726/26 |

FOREIGN PATENT DOCUMENTS

| | | |
|---|---|---|
| CN | 105531664 B | 10/2019 |
| CN | 113708921 A | 11/2021 |
| TW | 201537383 A | 10/2015 |
| TW | 201911692 A | 3/2019 |
| TW | 202141321 A | 11/2021 |
| WO | 01/50530 A1 | 7/2001 |

OTHER PUBLICATIONS

Case Tamper Detection Reference Design Using Inductive Sensing, 2017, Texas Instruments Incorporated, TI Designs: TIDA-01377, TIDUD41—Jun. 2017, https://www.ti.com/lit/ug/tidud41/tidud41. pdf?ts=1663650898681&ref_url=https%253A%252F%252Fwww. google.com%252F, pp. 1-48, Jun. 2017.

Kuan-Jen Lin et al., Using TPM to Improve Boot Security at BIOS Layer, 2012 IEEE International Conference on Consumer Electronics (ICCE), pp. 376-377, XP032124933, 2012.

* cited by examiner

COMPUTER SYSTEM FOR FAILING A SECURE BOOT IN A CASE TAMPERING EVENT

BACKGROUND OF THE INVENTION

1. Field of the Invention

The present invention relates to a computer system, and more particularly, to a computer system for failing a secure boot in a case tampering event.

2. Description of the Prior Art

When a case enclosing a computer system is detected to be tampered, a mechanism of case tampering of the computer system is applied to protect data of the computer system from being tampered. However, it is still unknown how the computer system fails a secure boot when a case tampering event happens. Thus, failing the secure boot in the case tampering event of the computer system is a problem to be solved.

SUMMARY OF THE INVENTION

The present invention therefore provides a method of failing a secure boot in a case tampering event of a computer system to solve the abovementioned problem.

A computer system for failing a secure boot in a case tampering event comprises a trusted platform module (TPM), for generating a plurality of random bytes for a secure boot of the computer system; a bootloader, for storing information in at least one hardware of the computer system and performing the secure boot, wherein the information comprises the plurality of random bytes, and the TPM is comprised in the bootloader; an operating system (OS), for performing the secure boot; and at least one sensor, for detecting a case tampering event in the computer system, and transmitting a signal for triggering a deletion of the plurality of random bytes, if the case tampering event happens in the computer system. The bootloader or the OS performs the operation of deleting the plurality of random bytes stored in the at least one hardware to fail the secure boot, in response to the signal.

A method of failing a secure boot in a case tampering event of a computer system comprises performing a secure boot of the computer system; generating a plurality of random bytes for the secure boot; storing information in at least one hardware of the computer system, wherein the information comprises the plurality of random bytes; detecting a case tampering event in the computer system; transmitting a signal for triggering a deletion of the plurality of random bytes, if a case tampering event happens; and deleting the plurality of random bytes stored in the at least one hardware to fail the secure boot, in response to the signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
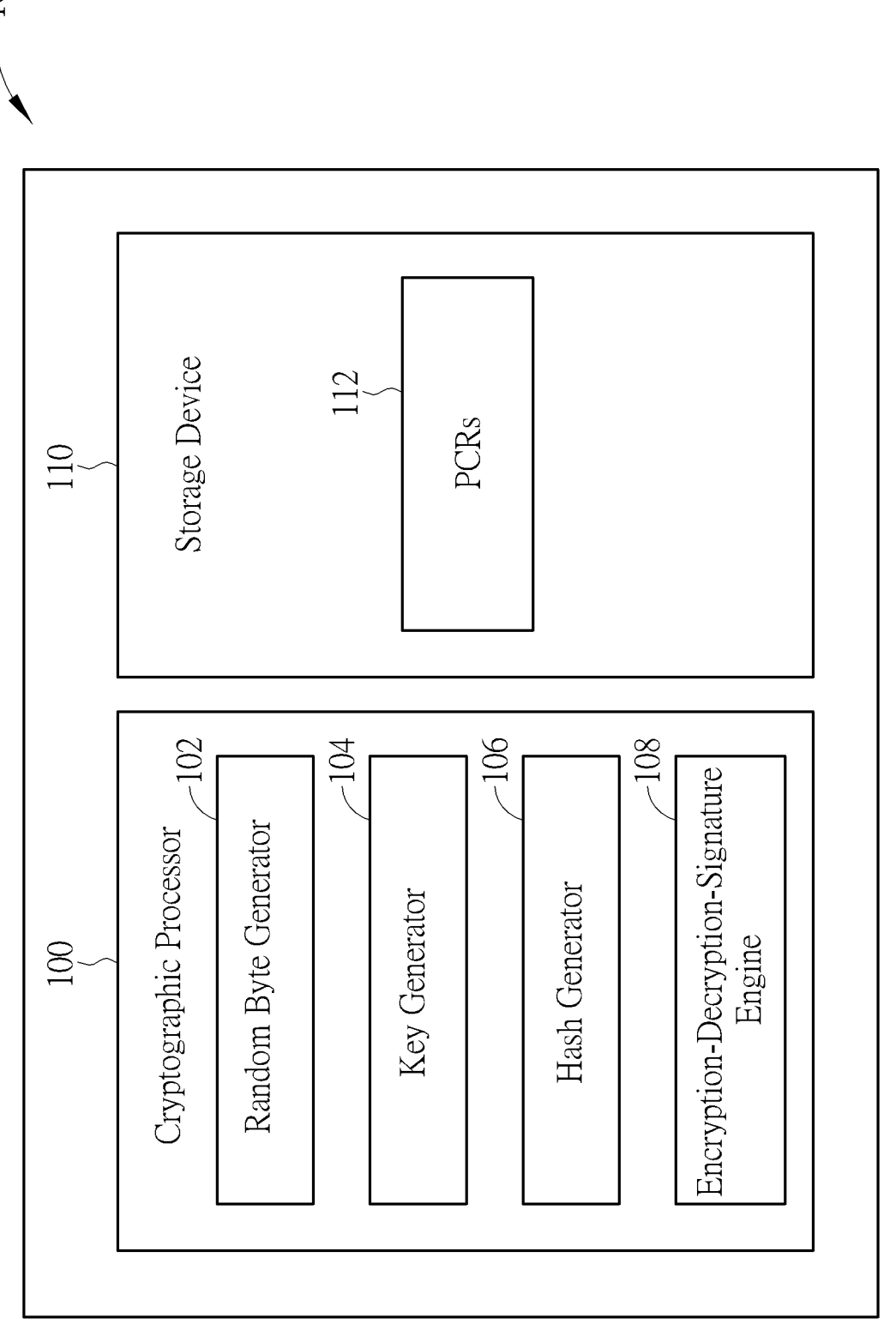
FIG. 1 is a schematic diagram of a trusted platform module (TPM) according to an example of the present invention.

FIG. 1 is a schematic diagram of a trusted platform module (TPM) 10 according to an example of the present invention. The TPM 10 is a passive hardware element which enhances security of a computer system, and is used to keep the computer system running well. As shown in FIG. 1, the TPM 10 includes a cryptographic processor 100 and a storage device 110. The cryptographic processor 100 includes a random byte generator 102, a key generator 104, a hash generator 106 and an encryption-decryption-signature engine 108. The random byte generator 102 may generate random bytes for a secure boot. The random bytes may include numbers, alphabets or punctuations. The key generator 104 may generate public keys for encryptions and private keys for decryptions. The hash generator 106 may generate hashes according to the random bytes generated by the random byte generator 102. The encryption-decryption-signature engine 108 may manage the public keys and the private keys for signings and verifications. The storage device 110 may be used to store an endorsement key (EK), a storage root key (SRK), attestation identity keys (AIKs) and storage keys. In addition, the storage device 110 includes platform configuration registers (PCRs) 112. The PCRs 112 stores the random bytes generated by the random byte generator 102, and generates hashes according to a cryptographic hash function and the random bytes. The hashes generated according to the cryptographic hash function may be drastically different even if the random bytes (i.e., inputs of the PCRs 112) are similar.

The PCRs 112 may initiate different functions of the TPM 10 according to different hashes, and may establish a PCR policy for the TPM 10. In a boot process, the TPM 10 may store information (e.g., a central processing unit (CPU) identity (ID), a media access control (MAC) address, a serial number, a product ID, . . . etc.) in the PCRs 112, and the PCRs 112 generates the hashes according to the above information. When the hashes are correct (i.e., the hashes generated by the PCRs 112 are the same as the hashes generated by the hash generator 106, and the TPM 10 is able to function according to the hashes), the random bytes stored in the PCRs 112 may be acquired.

Figure 2:
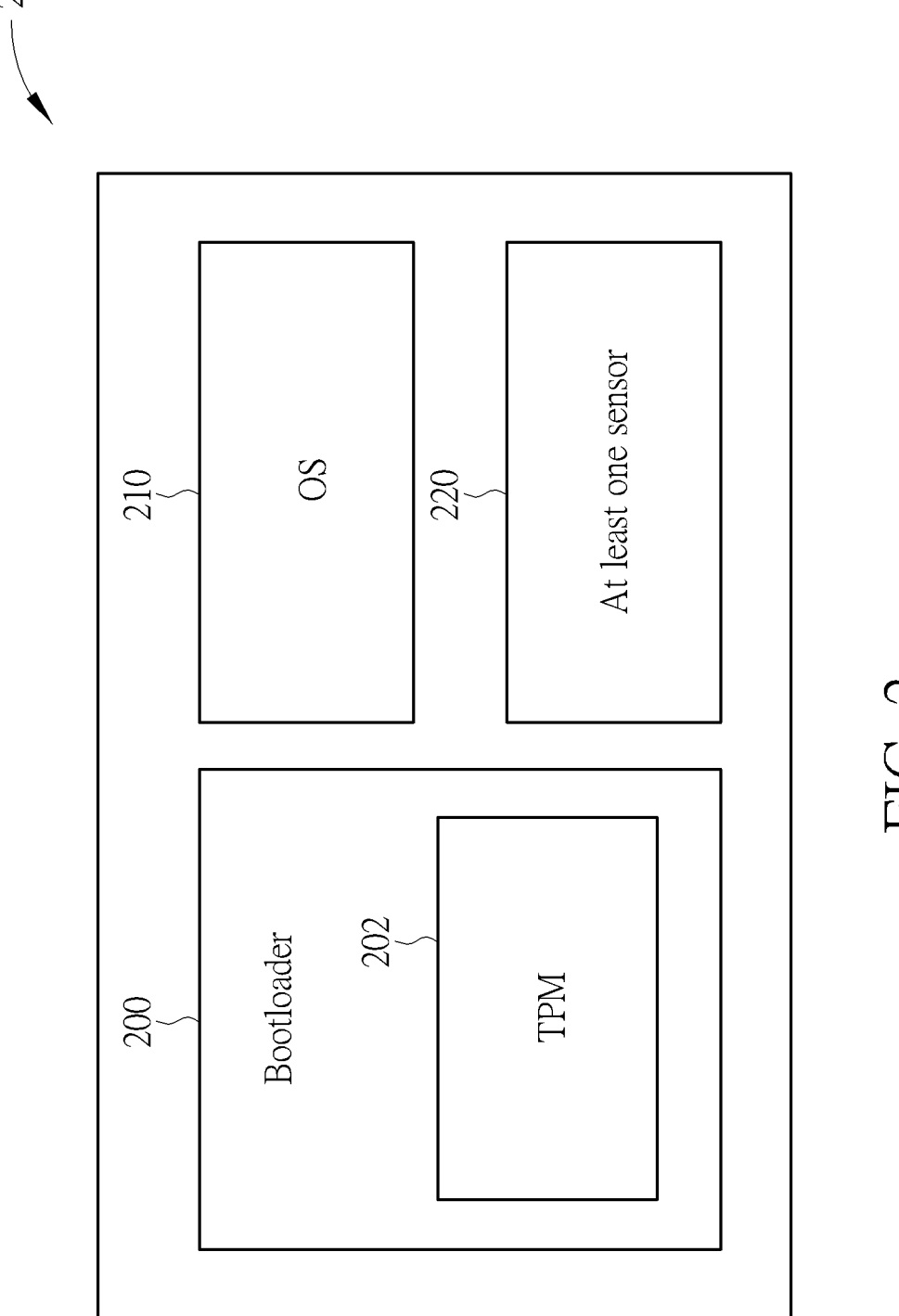
FIG. 2 is a schematic diagram of a computer system according to an example of the present invention.

FIG. 2 is a schematic diagram of a computer system 20 according to an example of the present invention. The computer system 20 includes a bootloader 200, an operating system (OS) 210 and at least one sensor 220. The bootloader 200 may be also called a basic input/output system (BIOS). The bootloader 200 performs hardware initialization in a power-on stage of the computer system 20. The bootloader 200 includes a TPM 202. The TPM 202 may be the TPM 10 described above, and is not narrated herein. The OS 210 manages hardware resource and software resource of the computer system 20, and provides services for the computer system 20. The OS 210 may be a Windows OS or a Linux OS, but is not limited thereto. The bootloader 200 and the OS 210 may apply asymmetric/symmetric keys for encryptions (e.g., using the public keys) and decryptions (e.g., using the private keys) to entire disk. The at least one sensor 220 may be configured to detect incidents (e.g., case tampering events) and to notice the bootloader 200 and/or the OS 210 of the computer system 20.

Figure 3:
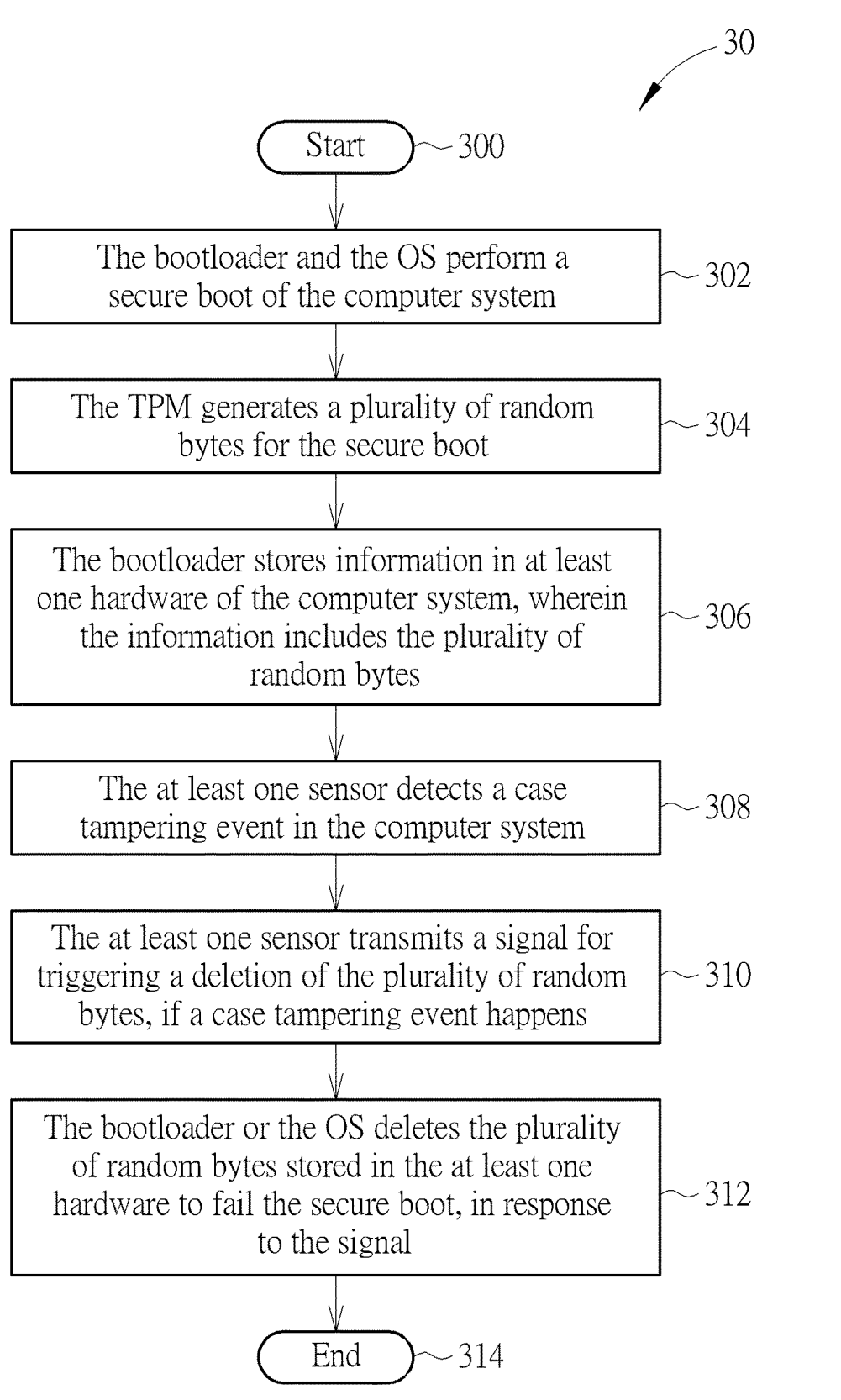
FIG. 3 is a flowchart of a process according to an example of the present invention.

FIG. 3 is a flowchart of a process 30 according to an example of the present invention. The process 30 may be utilized in the computer system 20, to detect a case tampering event. The process 30 may be complied into program codes and includes the following steps:

Step 300: Start.

Step 302: The bootloader 200 and the OS 210 perform a secure boot of the computer system 20.

Step 304: The TPM 202 generates a plurality of random bytes for the secure boot.

Step 306: The bootloader 200 stores information in at least one hardware of the computer system 20, wherein the information includes the plurality of random bytes.

Step 308: The at least one sensor 220 detects a case tampering event in the computer system 20.

Step 310: The at least one sensor 220 transmits a signal for triggering a deletion of the plurality of random bytes, if a case tampering event happens.

Step 312: The bootloader 200 or the OS 210 deletes the plurality of random bytes stored in the at least one hardware to fail the secure boot, in response to the signal.

Step 314: End.

According to process 30, when the secure boot of the computer system 20 is performed, the plurality of random bytes for the secure boot are generated and included in the information. The bootloader 200 stores the information in the at least one hardware of the computer system 20. The at least one sensor 220 detects the case tampering event in the computer system 20. If the case tampering event happens in the computer system 20, the at least one sensor 220 transmits the signal for triggering the bootloader 200 or the OS 210 to delete the plurality of random bytes stored in the at least one hardware. When receiving the signal from the at least one sensor 220, the bootloader 200 or the OS 210 deletes the plurality of random bytes stored in the at least one hardware, and the secure boot may fail (e.g., not be finished) accordingly. In other words, when the case tampering event happens, the secure boot of the computer system 20 is stopped for a security of the computer system 20.

It should be noted that when the secure boot is performed by the bootloader 200 currently, the plurality of random bytes are deleted by the bootloader 200. On the other hand, when the secure boot is performed by the OS 210 currently, the plurality of random bytes are deleted by the OS 210.

It should be noted that the plurality of random bytes generated by the TPM 202 may not be known (e.g., acquired) by external users of the computer system 20. Furthermore, even internal developers of the computer system 20 may not know (e.g., acquire) the plurality of random bytes. In other words, the plurality of random bytes can be acquired by neither the users nor the developers of the computer system 20. This mechanism prevents the computer system 20 from being tampered. In addition, when the case tampering event happens, the bootloader 200 or the OS 210 may simply delete the plurality of random bytes stored in the at least one hardware. Information other than the plurality of random bytes may not be involved and may be maintained.

In one example, the bootloader 200 and the OS 210 perform the secure boot according to the information stored in the at least one hardware. That is, if the case tampering event does not happen during the process of the secure boot, the computer system 20 completes the secure boot as a general secure boot of the computer system 20.

In one example, if the case tampering event happens in the OS 210, the OS deletes the plurality of random bytes stored in the at least one hardware. Then, the OS 210 reboots the computer system 20 and performs (e.g., forces into) the secure boot of the computer system 20. That is, when the secure boot is performed by the OS 210 currently, the plurality of random bytes are deleted by the OS 210 if the case tampering event happens. In addition, the case tampering event may happen even if the secure boot is completed. In this situation, the OS 210 may also delete the plurality of random bytes when receiving the signal indicating the case tampering event.

In one example, the at least one hardware of the computer system 20 includes a PCR. The PCR is included in the TPM 202. The PCR generates a plurality of hashes according to the plurality of random bytes. In one example, the secure boot of the computer system 20 may be completed, if the plurality of hashes are correct. That is, if the plurality of random bytes are not deleted (i.e., the case tampering event does not happen), the plurality of hashes are correct accordingly (i.e., the TPM 202 is able to function according to the plurality of hashes). Thus, the TPM 202 is able to function, which leads to a completion of the secure boot. It should be noted that the OS 210 may be able to provide services for a user of the computer system 20, after the secure boot is completed. In one example, the secure boot of the computer system 20 may fail, if the plurality of hashes are incorrect. That is, if the plurality of random bytes have been deleted (e.g., have been tampered), the plurality of hashes are incorrect accordingly (i.e., the TPM 202 is unable to function according to the plurality of hashes). Thus, the TPM 202 is unable to function, and the computer system 20 may not be able to process into the OS 210, which leads to a failure of the secure boot.

In one example, the bootloader 200 obtains the plurality of random bytes for the secure boot according to a password of the computer system 20 and the plurality of hashes, after the secure boot fails. The bootloader 200 stores the plurality of random bytes in the at least one hardware, and resumes the secure boot according to the plurality of random bytes. That is, to resume the secure boot which fails due to the case tampering event, the plurality of random bytes are obtained from the TPM 202 if the plurality of hashes generated by the PCR are correct. The computer system 20 identifies that the password (e.g., a BIOS password) is transmitted from the bootloader 200 to the PCR included in the TPM 202, and allows the bootloader 200 to obtain the plurality of random bytes for the secure boot, from the TPM 202. The computer system 20 may not allow the plurality of random bytes to be acquired, and the secure boot may not be resumed, if the computer system 20 identifies that the password is not transmitted from the bootloader 200 (e.g., transmitted from the OS 210), or if the password is wrong to the PCR.

In one example, when the case tampering event is detected, the bootloader 20 records the case tampering event. That is, the case tampering event may be recorded, to notify a user of the computer system 20.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the computer system 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage device) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the computer system 20.

To sum up, the present invention provides a computer system for failing a secure boot in a case tampering event. The computer system deletes the random bytes stored in the hardware to fail the secure boot when the case tampering is detected. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system for failing a secure boot in a case tampering event, comprising:

a bootloader, a trusted platform module (TPM) operatively coupled to the bootloader, the TPM including:
a cryptographic processor, comprising:
a random byte generator for generating a plurality of random bytes for a secure boot of the computer system; and
a hash generator for generating a plurality of first hashes according to the plurality of random bytes generated by the random byte generator; and
at least one hardware for storing the plurality of random bytes generated by the random byte generator and comprising:
a platform configuration register for generating a plurality of second hashes according to a cryptographic hash function and the plurality of random bytes generated by the random byte generator;
an operating system (OS), for performing the secure boot, wherein the secure boot of the computer system is completed if the plurality of second hashes generated by the platform configuration register are the same as the plurality of first hashes generated by the hash generator, and the secure boot of the computer system fails if the plurality of second hashes generated by the platform configuration register are not the same as the plurality of first hashes generated by the hash generator; and at least one sensor, for detecting a case tampering event in the computer system, and transmitting a signal for triggering a deletion of the plurality of random bytes, if the case tampering event happens in the computer system;

wherein the bootloader performs the operation of:
deleting the plurality of random bytes stored in the at least one hardware to fail the secure boot, in response to the signal; and wherein the bootloader further performs the operations of:
obtaining the plurality of random bytes for the secure boot according to a password of the computer system and the plurality of first hashes, after failing the secure boot;
storing the plurality of random bytes obtained after failing the secure boot in the at least one hardware; and
resuming the secure boot according to the plurality of random bytes obtained after failing the secure boot.

2. The computer system of claim 1, wherein the bootloader and the OS perform the secure boot according to the information stored in the at least one hardware.

3. The computer system of claim 1, wherein the OS further performs the operations of:
deleting the plurality of random bytes stored in the at least one hardware; and
rebooting the computer system, and performing the secure boot of the computer system.

4. A method of failing a secure boot in a case tampering event of a computer system, comprising:
performing a secure boot of the computer system;
generating a plurality of random bytes for the secure boot;
storing information in at least one hardware of the computer system, wherein the information comprises the plurality of random bytes and the at least one hardware of the computer system comprises a platform configuration register (PCR);
generating a plurality of first hashes according to the plurality of random bytes by a hash generator of the computer system;
generating a plurality of second hashes according to the information stored in the at least one hardware by the PCR;
detecting a case tampering event in the computer system;
transmitting a signal for triggering a deletion of the plurality of random bytes, if a case tampering event happens; and
deleting the plurality of random bytes stored in the at least one hardware to fail the secure boot, in response to the signal, wherein the secure boot of the computer system is completed if the plurality of second hashes generated by the platform configuration register are the same as the plurality of first hashes generated by the hash generator, and the secure boot of the computer system fails if the plurality of second hashes generated by the platform configuration register are not the same as the plurality of first hashes generated by the hash generator;
obtaining the plurality of random bytes for the secure boot according to a password of the computer system and the plurality of first hashes, after failing the secure boot;
storing the plurality of random bytes obtained after failing the secure boot in the at least one hardware; and
resuming the secure boot according to the plurality of random bytes obtained after failing the secure boot.

5. The method of claim 4, wherein the secure boot is performed according to the information stored in the at least one hardware.

6. The method of claim 4, wherein the method further comprises:

deleting the plurality of random bytes stored in the at least one hardware; and rebooting the computer system, and performing the secure boot of the computer system.

* * * * *